US012705913B2

(12) United States Patent
Kim et al.

(10) Patent No.: US 12,705,913 B2
(45) Date of Patent: Aug. 11, 2026

(54) METHOD AND ELECTRONIC DEVICE FOR RECOGNIZING TEXT IN IMAGE

(71) Applicant: Samsung Electronics Co., Ltd., Suwon-si (KR)

(72) Inventors: Younguk Kim, Suwon-si (KR); Kyungsu Kim, Suwon-si (KR); Ohjoon Kwon, Suwon-si (KR); Yehoon Kim, Suwon-si (KR); Hyunhan Kim, Suwon-si (KR); Hyosang Kim, Suwon-si (KR); Hyungmin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 441 days.

(21) Appl. No.: 18/076,787

(22) Filed: Dec. 7, 2022

(65) Prior Publication Data

US 2023/0206665 A1 Jun. 29, 2023

Related U.S. Application Data

(63) Continuation of application No. PCT/KR2022/019570, filed on Dec. 5, 2022.

(30) Foreign Application Priority Data

Dec. 28, 2021 (KR) ........................ 10-2021-0190337
Feb. 21, 2022 (KR) ........................ 10-2022-0022452

(51) Int. Cl.
*G06V 30/148* (2022.01)
*G06F 40/232* (2020.01)
(Continued)

(52) U.S. Cl.
CPC .......... *G06V 30/148* (2022.01); *G06F 40/232* (2020.01); *G06F 40/253* (2020.01);
(Continued)

(58) Field of Classification Search
CPC ........ G06V 30/148; G06V 30/19; G06T 7/70; G06T 2207/20132; G06F 40/253; G06F 40/232
See application file for complete search history.

(56) References Cited

U.S. PATENT DOCUMENTS 8,401,293 B2 3/2013 Antonijevic et al.
10,853,638 B2 12/2020 Mukhopadhyay et al.
(Continued)

FOREIGN PATENT DOCUMENTS

CN 112232149 A 1/2021
CN 112949285 A * 6/2021 ........... G06F 40/253
(Continued)

OTHER PUBLICATIONS

Harsh Jain, "BERT for "Everyone" (Tutorial + Implementation)", kaggle.com/code/harshjain 123/bert-for-everyone-tutorial-implementation, published May 25, 2021 (Year: 2021).*
(Continued)

*Primary Examiner* — Oneal R Mistry
*Assistant Examiner* — Nhut Huy Pham
(74) *Attorney, Agent, or Firm* — Jefferson IP Law, LLP

(57) ABSTRACT

A method and an electronic device for recognizing text are provided. The method includes detecting positions of pieces of text included in the text in the image, generating cropped images by cropping areas corresponding to the pieces of text in the image, recognizing characters of the pieces of text based on the cropped images, generating a sentence by inputting the positions of the pieces of text and the characters of the pieces of text to a multimodal language model, wherein the multimodal language model is an artificial intelligence (AI) model for inferring an original sentence of the text, and displaying the sentence.

18 Claims, 13 Drawing Sheets

(51) Int. Cl.

| | |
|---|---|
| ***G06F 40/253*** | (2020.01) |
| ***G06T 7/70*** | (2017.01) |
| ***G06V 10/82*** | (2022.01) |
| ***G06V 20/62*** | (2022.01) |
| ***G06V 30/10*** | (2022.01) |
| ***G06V 30/19*** | (2022.01) |

(52) U.S. Cl.

CPC ................ *G06T 7/70* (2017.01); *G06V 30/19* (2022.01); *G06T 2207/20132* (2013.01)

(56) References Cited

U.S. PATENT DOCUMENTS

| | | | | |
|---|---|---|---|---|
| 10,936,904 | B2 | 3/2021 | Nah et al. | |
| 12,026,982 | B2 * | 7/2024 | Lee | G06V 30/32 |
| 2019/0065476 | A1 | 2/2019 | Kwon et al. | |
| 2020/0226400 | A1 * | 7/2020 | Corring | G06V 10/82 |
| 2020/0410291 | A1 * | 12/2020 | Kriegman | G06V 20/63 |
| 2021/0004432 | A1 * | 1/2021 | Li | G06F 40/295 |
| 2021/0157864 | A1 | 5/2021 | Castaneda et al. | |
| 2021/0201182 | A1 * | 7/2021 | Li | G06F 16/9024 |
| 2021/0227082 | A1 | 7/2021 | Mori et al. | |
| 2021/0390296 | A1 * | 12/2021 | En | G06V 10/82 |
| 2023/0418856 | A1 * | 12/2023 | Cai | G06F 40/30 |

FOREIGN PATENT DOCUMENTS

| | | | |
|---|---|---|---|
| CN | 113221735 | A | 8/2021 |
| CN | 113343982 | A | 9/2021 |
| CN | 113361247 | A | 9/2021 |
| KR | 10-2019-0021146 | A | 3/2019 |
| KR | 10-2020-0087225 | A | 7/2020 |
| KR | 10-2144464 | B1 | 8/2020 |
| KR | 10-2206604 | B1 | 1/2021 |
| KR | 10-2021-0109145 | A | 9/2021 |

OTHER PUBLICATIONS

Xu, Yiheng, et al. "Layoutlm: Pre-training of text and layout for document image understanding." Proceedings of the 26th ACM SIGKDD international conference on knowledge discovery & data mining, 2020. (Year: 2020).*

He, Pengcheng, et al. "Deberta: Decoding-enhanced bert with disentangled attention." arXiv (Year: 2020).*

Inbasekaran, Aravind et al. "Using transfer learning to contextually optimize optical character recognition (OCR) output and perform new feature extraction on a digitized cultural and historical dataset." IEEE, published Dec. 15, 2021 (Year: 2021).*

Xu, Yiheng, et al. "LayoutLM: Pre-training of text and layout for document image understanding." Proceedings of the 26th ACM SIGKDD international conference on knowledge discovery & data mining (Year: 2020).*

International Search Report and Written Opinion dated Mar. 16, 2023, issued in International Patent Application No. PCT/KR2022/019570.

* cited by examiner

310
IMAGE INCLUDING TEXT
330
TEXT DETECTION MODEL
SENTENCE
320
350
MULTIMODAL LANGUAGE MODEL
WORD 1
340
TEXT RECOGNITION MODEL
viated
332
Position 1
334
WORD 2
340
TEXT RECOGNITION MODEL
Position 2
...
WORD N
340
TEXT RECOGNITION MODEL
instructions
Position N

FIG. 7

| | Index | Position | Piece of text |
|---|---|---|---|
| 710 | 0 | (315, 1402), (435, 1532) | F |
| 720 | 1 | (456, 1414), (502, 1451) | or |
| 730 | M | (305, 1564), (444, 1624) | viated |
| | N | (433, 1485), (571, 1530) | follow |
| | … | … | … |

METHOD AND ELECTRONIC DEVICE FOR RECOGNIZING TEXT IN IMAGE

CROSS-REFERENCE TO RELATED APPLICATION(S)

This application is a continuation application, claiming priority under § 365(c), of an International application No. PCT/KR2022/019570, filed on Dec. 5, 2022, which is based on and claims the benefit of a Korean patent application number 10-2021-0190337, filed on Dec. 28, 2021, in the Korean Intellectual Property Office, and of a Korean patent application number 10-2022-0022452, filed on Feb. 21, 2022, in the Korean Intellectual Property Office, the disclosure of each of which is incorporated by reference herein in its entirety.

TECHNICAL FIELD

The disclosure relates to an electronic device for recognizing a text in an image by using an artificial intelligence (AI) model and an operating method of the electronic device.

BACKGROUND ART

Various techniques to recognize text are used in various computer vision fields. By using an optical character recognition (OCR) method, an area corresponding to a text in an image is detected and the text is recognized. According to this method, detection and recognition are separately performed from each other, and thus, other characters or linguistic context in an image are not reflected in a text recognition result.

Provided is a method of recognizing a text in an image and generating a complete sentence by taking into account grammar, spelling, and regularity of a language, etc., by using a multimodal language model using position information of text in an image, rather than simply using information about the text.

The above information is presented as background information only to assist with an understanding of the disclosure. No determination has been made, and no assertion is made, as to whether any of the above might be applicable as prior art with regard to the disclosure.

DESCRIPTION OF EMBODIMENTS

Technical Problem

Aspects of the disclosure are to address at least the above-mentioned problems and/or disadvantages and to provide at least the advantages described below. Accordingly, an aspect of the disclosure is to provide a multimodal language model for recognizing a text in an image by receiving not only text but also receiving available data in addition to the text.

Another aspect of the disclosure is to provide an electronic device for accurately inferring an original sentence of a text in an image by using a multimodal language model, and an operating method of the electronic device.

Additional aspects will be set forth in part in the description which follows and, in part, will be apparent from the description, or may be learned by practice of the presented embodiments.

Technical Solution to Problem

In accordance with an aspect of the disclosure, a method, performed by an electronic device, of recognizing text in an image is provided. The method includes detecting positions of pieces of text included in the text in the image, generating cropped images by cropping areas corresponding to the pieces of text in the image, recognizing characters of the pieces of text based on the cropped images, generating a sentence by inputting the positions of the pieces of text and the characters of the pieces of text to a multimodal language model, wherein the multimodal language model is an artificial intelligence (AI) model for inferring an original sentence of the text, and displaying the sentence.

The multimodal language model may have been trained based on a training data set including positions of a sentence and words in the sentence.

The detecting of the positions of the pieces of text includes obtaining data indicating the positions of the pieces of text by applying the image to a text detection model.

The recognizing of the characters of the pieces of text includes obtaining the characters of the pieces of text corresponding to the cropped images, respectively, by applying each of the cropped images to a text recognition model.

The method further includes generating a text-position set by matching a character of a first piece of text of the text with a position of the first piece of text and matching a character of a second piece of text of the text with a position of the second piece of text, and the generating of the sentence includes inputting the text-position set to the multimodal language model.

The method further includes indexing the text-position set.

The inputting of the text-position set to the multimodal language model includes further inputting an index of the text-position set to the multimodal language model.

The generating of the sentence includes applying a different weight to each of the positions of the pieces of text and the characters of the pieces of text.

The displaying of the sentence includes separately displaying elements of the sentence, the elements of the sentence including at least one of a subject, an object, or a verb.

The displaying of the sentence further includes displaying a recommended word for replacing a word in the sentence in order to modify a grammar or spelling error of the sentence.

In accordance with another aspect of the disclosure, an electronic device for recognizing text in an image is provided. The electronic device includes a display, a memory storing one or more instructions and at least one processor configured to execute the one or more instructions stored in the memory to detect positions of pieces of text included in the text in the image, generate cropped images by cropping areas corresponding to the pieces of text in the image, recognize characters of the pieces of text based on the cropped images, generate a sentence by inputting the positions of the pieces of text and the characters of the pieces of text to a multimodal language model, wherein the multimodal language model is an artificial intelligence (AI) model for inferring an original sentence of the text, and control the display to display the sentence.

In accordance with another aspect of the disclosure, a computer-readable recording medium having recorded thereon a program for executing any one of the described methods, performed by an electronic device, of recognizing text in an image is provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 7 is a diagram for describing an operation, performed by an electronic device, of generating data to be input to a multimodal language model according to an embodiment of the disclosure;

Throughout the drawings, like reference numerals will be understood to refer to like parts, components, and structures.

MODE OF DISCLOSURE

Figure 1:
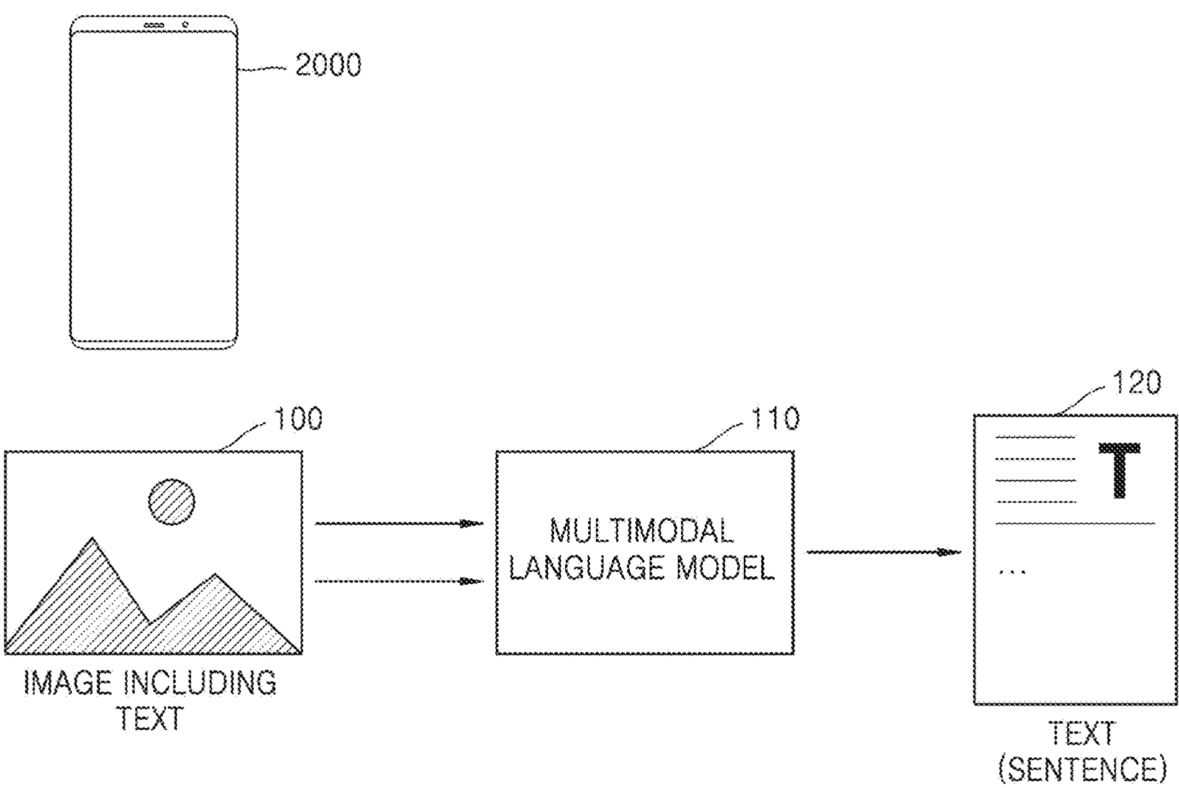
FIG. 1 is a diagram for schematically describing an operation, performed by an electronic device, of recognizing text according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

In the disclosure, general terms that have been widely used nowadays are selected, when possible, in consideration of functions of embodiments of the disclosure, but non-general terms may be selected according to the intentions of technicians in the art, precedents, or new technologies, etc. Also, some terms may be arbitrarily chosen by the applicant. The meanings of these terms will be explained in corresponding parts of an embodiment of the disclosure in detail. Thus, the terms used herein should be defined not based on the names thereof but based on the meanings thereof and the whole context of the disclosure.

Terms used herein, including technical or scientific terms, may have the same meaning as commonly understood by one of ordinary skill in the art described in the disclosure. Also, the terms including an ordinal number, such as "first" or "second," may be used to describe various components, but these components shall not be limited by those terms. The terms are used only for distinguishing one component from another component.

Throughout the disclosure, it will be understood that when an element is referred to as "including" another element, the element may further include other elements unless mentioned otherwise. Also, the terms, such as "unit" or "module," used in the disclosure, should be understood as a unit that processes at least one function or operation and that may be embodied in a hardware manner, a software manner, or a combination of the hardware manner and the software manner.

Hereinafter, embodiments of the disclosure will be described in detail with reference to the accompanying drawings, so that the embodiments of the disclosure may be easily implemented by one of ordinary skill in the art. However, the disclosure may have different forms and should not be construed as being limited to the embodiments described herein. Also, in the drawings, parts not related to descriptions are omitted for the clear description of the disclosure, and throughout the specification, like reference numerals are used for like elements.

FIG. 1 is a diagram for schematically describing an operation, performed by an electronic device 2000, of recognizing text according to an embodiment of the disclosure.

Referring to FIG. 1, according to an embodiment of the disclosure, an electronic device 2000 may recognize a text in an image 100. The electronic device 2000 may recognize the text in the image 100 and reconstruct a recognized text as the text 120, by using a multimodal language model 110.

In an embodiment of the disclosure, the multimodal language model 110 may be an artificial intelligence (AI) model receiving data of different dimensions and inferring a sentence and may include a plurality of sub-networks. The multimodal language model 110 may infer an original sentence in the image by receiving data of various modalities, such as an image, text, a position of the text, etc. In some embodiments of the disclosure, the multimodal language model 110 may generate a complete sentence by receiving characters of the text and a position of the text and reflecting the grammar, the spelling, the regularity, etc. of a language.

Hereinafter, aspects regarding an operation and the characteristics of the multimodal language model 110 used in the disclosure will be described in detail by referring to the drawings below and the descriptions thereof.

Figure 2:
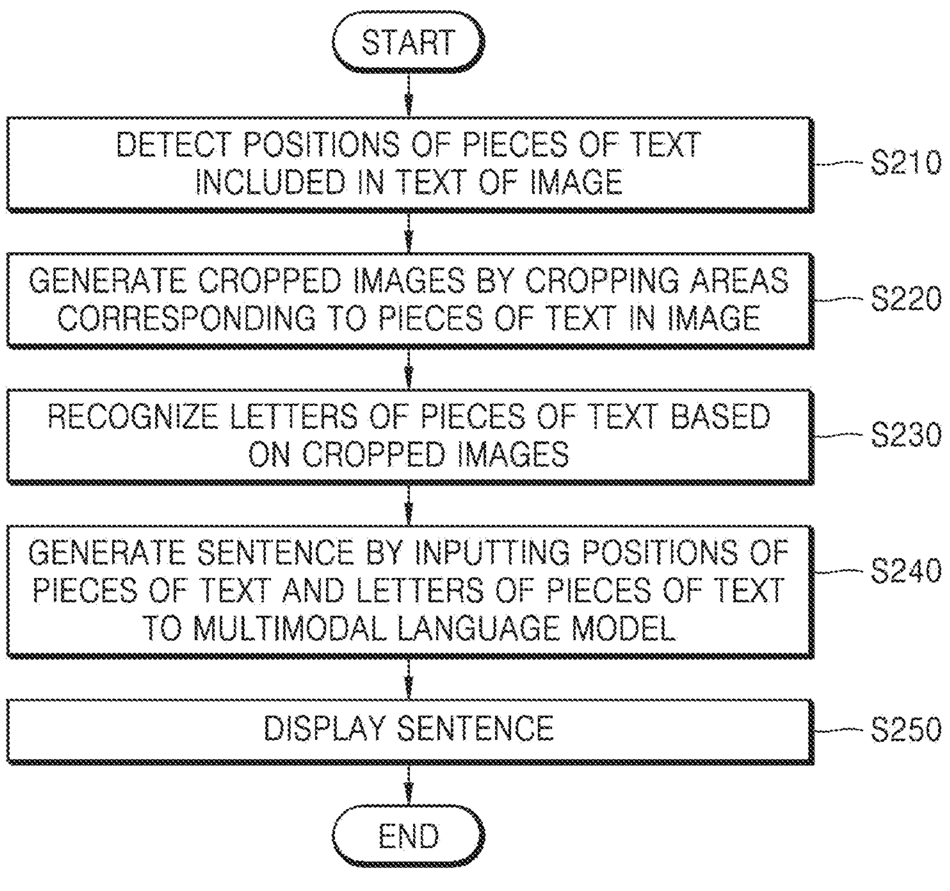
FIG. 2 is a flowchart of operations, performed by an electronic device, of recognizing text according to an embodiment of the disclosure.

FIG. 2 is a flowchart of operations, performed by the electronic device 2000, of recognizing text according to an embodiment of the disclosure.

Referring to FIG. 2, in operation S210, an electronic device 2000 according to an embodiment of the disclosure may detect positions of pieces of text included in a text in an image.

In an embodiment of the disclosure, the electronic device 2000 may obtain an image. The electronic device 2000 may obtain an image stored in a memory of the electronic device 2000. For example, the electronic device 2000 may obtain an image captured by using a camera. As another example, the electronic device 2000 may obtain an image from the outside (for example, a server, another electronic device, and the like).

In an embodiment of the disclosure, the image obtained by the electronic device 2000 may include text. The text included in the image may be formed of pieces of text. The pieces of text refer to units in which the electronic device 2000 detects the text in the image.

In an embodiment, the electronic device 2000 may detect positions of the pieces of text, with respect to the text included in the obtained image. The electronic device 2000 may detect a boundary box of the pieces of text in the image and may obtain a coordinate in an image of the boundary box. In some embodiments of the disclosure, the electronic device 2000 may detect the pieces of text by using a text detection model. The text detection model may include, for example, a convolutional neural network (CNN) model, but is not limited thereto.

In operation S220, the electronic device 2000, according to an embodiment of the disclosure, may generate cropped images by cropping areas in the image, the areas corresponding to the pieces of text.

In an embodiment of the disclosure, the electronic device 2000 may crop the image based on the detected positions of the pieces of text. For example, the electronic device 2000 may generate the cropped images by cropping the image based on the detected boundary box. The electronic device 2000 may generate the cropped images including the pieces of text, by cropping at least some areas of all sets of text included in the image.

In operation S230, the electronic device 2000, according to an embodiment of the disclosure, may recognize characters of the pieces of text based on the cropped images.

In an embodiment of the disclosure, the electronic device 2000 may recognize the characters of the pieces of text each included in each of the cropped images. The electronic device 2000 recognizing the characters may refer to the electronic device 2000 identifying the text included in the image in the form of a character code editable by a computer.

In some embodiments of the disclosure, the electronic device 2000 may recognize the characters of the pieces of text by using a text recognition model. In an embodiment, the text recognition model may include, for example, a recurrent neural network (RNN), but is not limited thereto.

In a situation in which the electronic device 2000 obtains the positions of the pieces of text and the characters of the pieces of text according to the operations described above, the electronic device 2000 may infer a sentence corresponding to the text in the image in association with the positions of the text and the characters of the text.

In operation S240, the electronic device 2000, according to an embodiment of the disclosure, may generate the sentence by inputting the positions of the pieces of text and the characters of the pieces of text to a multimodal language model.

In an embodiment of the disclosure, the multimodal language model may be an AI model for inferring a sentence by receiving data of different dimensions. The multimodal language model may have been trained based on a training data set including positions of a sentence and words in the sentence. The data of different dimensions input to the multimodal language model refers to data of various modalities, such as an image, text, and the like. In some embodiments of the disclosure, a character of text may be input to the multimodal language model, as first modality data, and a position of the text may be input to the multimodal language model, as second modality data. The multimodal language model may generate a complete sentence by reflecting the grammar, the spelling, and the regularity of a language, by using the character of the text and the position of the text that are input. In some embodiments of the disclosure, when calculation is performed by using layers included in the multimodal language model, different weights may be applied to the data of different modalities that is input to the multimodal language model. In the multimodal language model, a first weight may be applied to the character of the text, which is the first modality data, and a second weight may be applied to the position of the text, which is the second modality data. The first weight and the second weight may be different from each other.

In operation S250, the electronic device 2000, according to an embodiment of the disclosure, may display the sentence. In an embodiment of the disclosure, the electronic device 2000 may display the generated sentence on a display. In some embodiments of the disclosure, when the electronic device 2000 displays the sentence, the electronic device 2000 may separately display elements of the sentence. The elements of the sentence may include at least one of a subject, an object, or a verb. In some embodiments of the disclosure, when the electronic device 2000 displays the sentence, the electronic device 2000 may also display a recommended word to replace a word of the sentence in order to modify a grammar or spelling error of the sentence.

Detailed operations, performed by an electronic device 2000, of detecting and recognizing pieces of text included in an image from the image and generating a sentence are further described hereinafter with reference to the corresponding drawings.

Figure 3:
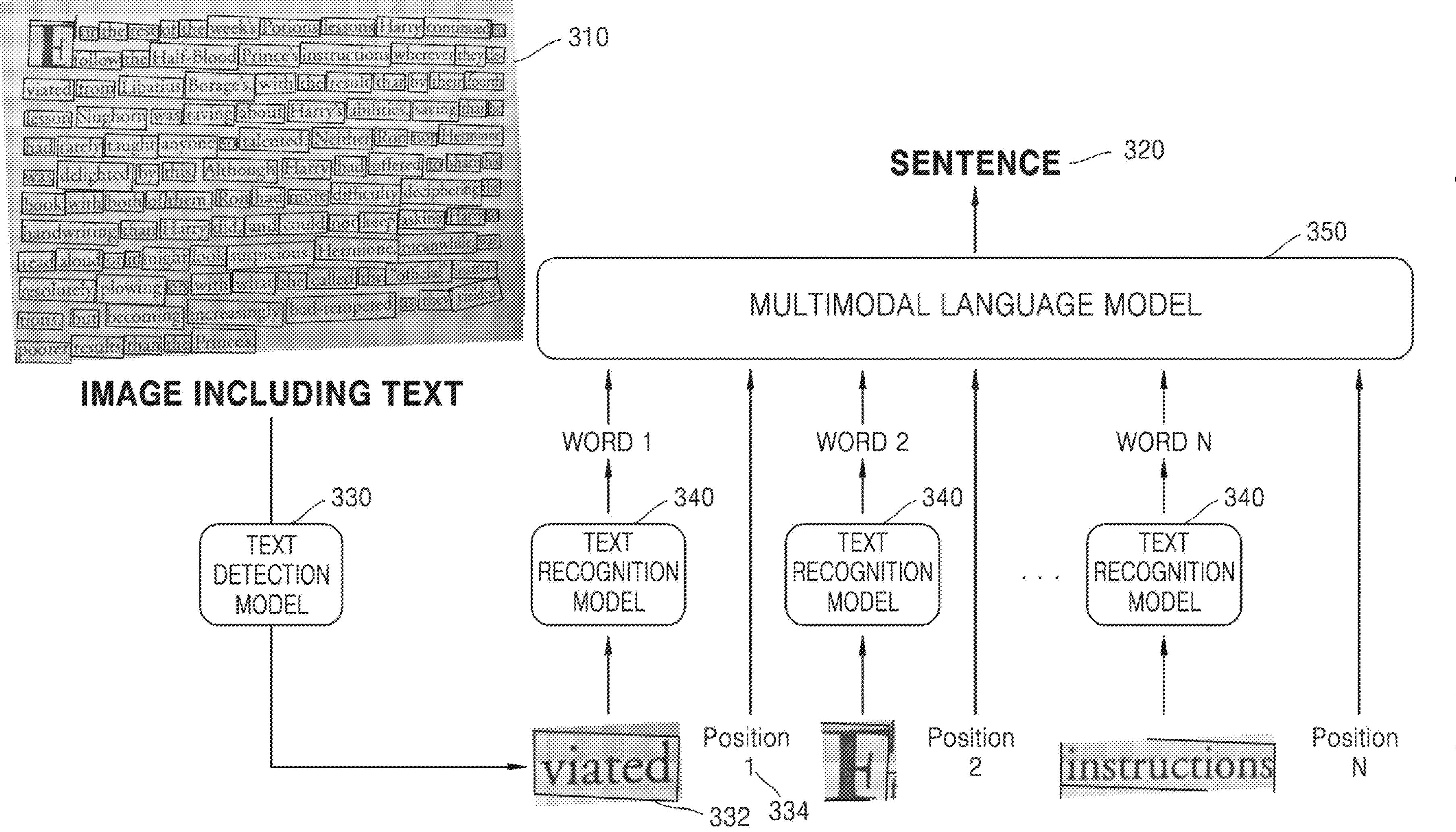
FIG. 3 is a diagram for describing a general architecture in which an electronic device generates a sentence from an input image according to an embodiment of the disclosure.

FIG. 3 is a diagram for describing a general architecture in which the electronic device 2000 generates a sentence from an input image according to an embodiment of the disclosure.

Referring to FIG. 3, the electronic device 2000 according to an embodiment of the disclosure may generate a sentence 320 from an image 310 including text.

In an embodiment of the disclosure, an electronic device 2000 may detect positions of pieces of a text in an image 310 including the text, by using a text detection model 330. The text detection model 330 may include, for example, a CNN model, but is not limited thereto. In a situation in which the electronic device 2000 detects the positions of the pieces of text, the electronic device 2000 may crop areas corresponding to the pieces of text. For example, a first piece of text that the electronic device 2000 detects from the image 310 including text may be "viated." The electronic device 2000 may obtain a first cropped image 332 corresponding to the first piece of text "viated" and a first position 334 of the first piece of text.

In an embodiment of the disclosure, the electronic device 2000 may recognize characters the pieces of text in the cropped images, by using a text recognition model 340. The text recognition model 340 may include, for example, an RNN, but is not limited thereto.

The electronic device 2000 may perform character recognition on all of the pieces of text in the image 310 including text. The electronic device 2000, for example, may identify that characters 342 of the first piece of text are "viated" based on the first cropped image 332.

In an embodiment of the disclosure, the electronic device 2000 may generate a sentence 320 by using a multimodal language model 350. In an embodiment of the disclosure, the multimodal language model 350 may receive the identified characters and the position of the characters. The multimodal language model 350 may receive the characters 342 of the first piece of text and the first position 334 of the first piece of text. The multimodal language model 350 may infer an original sentence in the image 310 including text, by forming a sentence by aligning pieces of text by using all the characters and the positions of the characters in the image 310 including text, and modifying a spelling error, a grammar error, etc. in the sentence.

In an embodiment, the multimodal language model 350 is a model receiving the characters and the positions of the characters, and thus, the multimodal language model 350 may not have to receive word, phrase, and clause units, etc. constituting the sentence 320 according to an order. The electronic device 2000, for example, may input the characters and the positions of the characters identified from the image 310 including text randomly to the multimodal language model 350.

Figure 4:
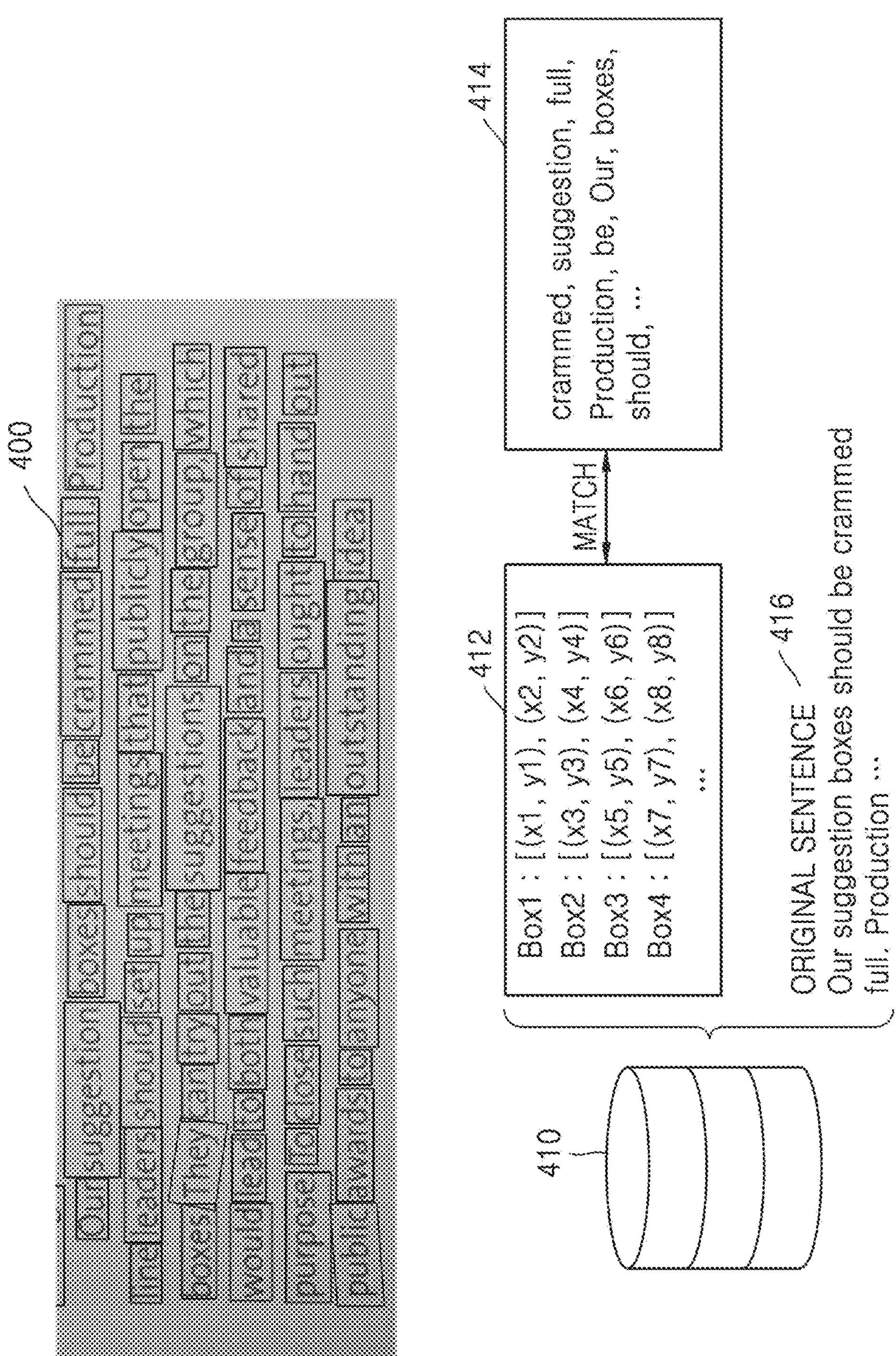
FIG. 4 is a diagram for describing an operation, performed by an electronic device, of generating a training data set of a multimodal language model according to an embodiment of the disclosure.

FIG. 4 is a diagram for describing an operation, performed by the electronic device 2000, of generating a training data set 410 of a multimodal language model according to an embodiment of the disclosure.

Referring to FIG. 4, an electronic device 2000 according to an embodiment of the disclosure may generate a training data set 410 by using a training image 400 including text. According to an embodiment of the disclosure, a multimodal language model may have been trained based on the training data set 410 including positions of a sentence and words in the sentence. For example, the electronic device 2000 may generate the training data set 410 for training the multimodal language model.

In an embodiment of the disclosure, the electronic device 2000 may detect positions 412 of pieces of text from the training image 400 including text and may identify characters 414 of the pieces of text.

In an embodiment of the disclosure, the electronic device 2000 may obtain an upper left coordinate and a lower right coordinate of a boundary box in which the pieces of text are detected as the positions 412 of the pieces of text. The coordinates, for example, may be coordinates in the training image 400 including text. For example, the electronic device 2000 may obtain a position [(x1, y1), (x2, y2)] of boundary box 1, a position [(x3, y3), (x4, y4)] of boundary box 2, a position [(x5, y5), (x6, y6) of boundary box 3, a position [(x7, y7), (x8, y8)] of boundary box 4, etc.

In some embodiments of the disclosure, the electronic device 2000 may identify the characters 414 of the pieces of text. The electronic device 2000, for example, may obtain crammed, suggestion, full, Production, be, Our, boxes, should, etc., which are the characters in the training image 400 including text.

In an embodiment, the electronic device 2000 according to an embodiment of the disclosure may match the positions 412 of the pieces of text with the characters 414 of the pieces of text. The electronic device 2000, for example, may perform text detection and recognition on the training image 400 including text and may match the coordinate [(x3, y3), (x4, y4)], which is the position corresponding to the characters "suggestion," with the characters "suggestion."

In an embodiment of the disclosure, the training data set 410 may include an original sentence 416 in the training image 400 including text. For example, the electronic device 2000 may also include the original sentence 416 of the text included in the training image 400 including text, "Our suggestion boxes should be crammed full. Production . . . ,' in the training data set 410.

The electronic device 2000 may generate the training data set 410 formed of the original sentence 416, the positions 412 of the pieces of text in the sentence, and the characters 414 of the pieces of text. The electronic device 2000 may generate the training data set 410 and may use the generated training data set 410 to train the multimodal language model or perform fine adjustment on the multimodal language model.

Figure 5A:
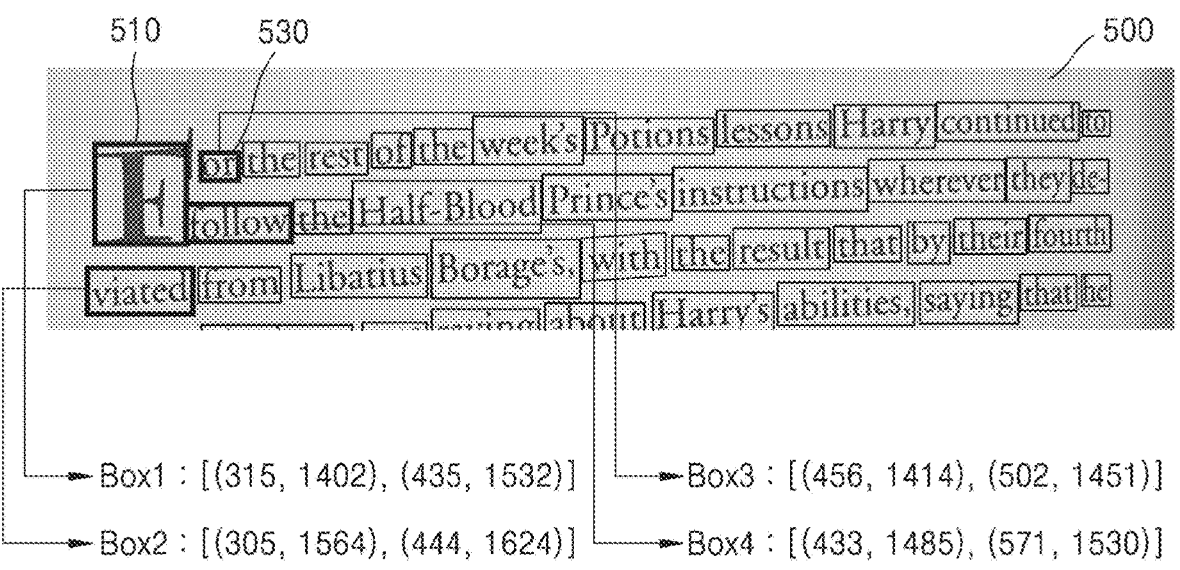
FIG. 5A is a diagram for describing an operation, performed by an electronic device, of detecting positions of pieces of text according to an embodiment of the disclosure.

FIG. 5A is a diagram for describing an operation, performed by the electronic device 2000, of detecting positions of pieces of text according to an embodiment of the disclosure.

According to an embodiment of the disclosure, an electronic device 2000 may detect positions of pieces of text included in the text in an image 500. In some embodiments of the disclosure, the electronic device 2000 may apply the image 500 to a text detection model in order to detect the positions of the pieces of text. In an embodiment, the electronic device 2000 may obtain data indicating the positions of the pieces of text by using the text detection model. For example, the data indicating the positions of the pieces of text may be coordinates of a boundary box in the image 500, but is not limited thereto. In addition, the coordinates of the boundary box in the image 500 may be an upper left coordinate and a lower right coordinate of the boundary box, but is not limited thereto.

In an embodiment of the disclosure, as a result of detecting the positions of the pieces of text via the electronic device 2000, a position of boundary box 1 corresponding to a first piece of text 510 "F" may be [(315, 1402), (435, 1532)], a position of boundary box 2 corresponding to a second piece of text 510 "viated" may be [(305, 1564), (444, 1624)], a position of boundary box 3 corresponding to a third piece of text 530 "or" may be [(456, 1414), (502, 1451)], and a position of boundary box 4 corresponding to a fourth piece of text "follow" may be [(433, 1485), (571, 1530)].

In a situation on which the electronic device 2000 determines an order of the pieces of text based on the positions of the pieces of text, an original sentence may be inferred only when the first piece of text 510 "F" is merged with the third piece of text 530 "or" into one word "for." Referring to the image 500, the third piece of text 530 "or" and the fourth piece of text 540 "follow" are adjacent to the first piece of text 510 "F." However, the position of the first piece of text 510 "F" [(315, 1402), (435, 1532)] is closer to the position of the fourth piece of text 540 "follow" than to the position of the third piece of text 530 "or" [(456, 1414), (502, 1451)], and thus, when a sentence is constructed based on the adjacent positions, a wrong sentence may be generated. To recognize not only positions of pieces of text, but also characters of the pieces of text in order to infer an original sentence in an image, the electronic device 2000 may use a multimodal language model receiving the positions of the pieces of text and the characters of the pieces of text.

Figure 5B:
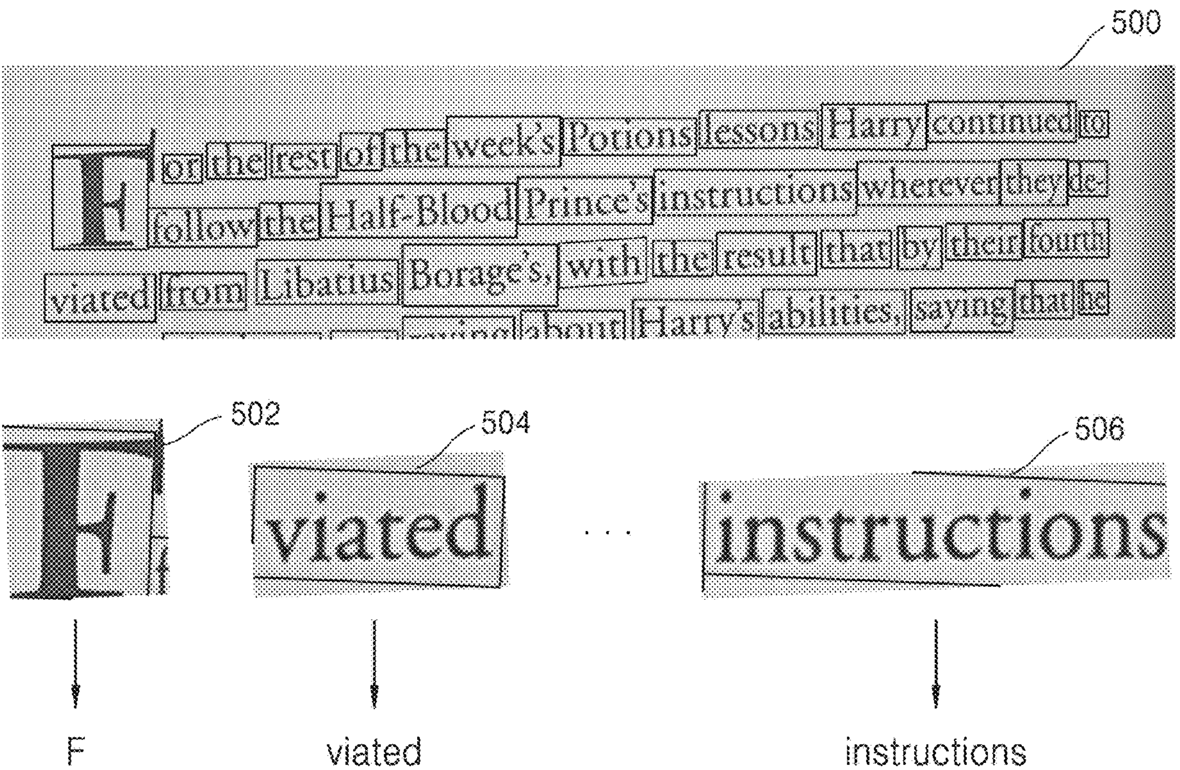
FIG. 5B is a diagram for describing an operation, performed by an electronic device, of recognizing characters of pieces of text according to an embodiment of the disclosure.

FIG. 5B is a diagram for describing an operation, performed by the electronic device 2000, of recognizing characters of pieces of text according to an embodiment of the disclosure.

According to an embodiment of the disclosure, when an electronic device 2000 detects positions of pieces of text, the electronic device 2000 may crop areas corresponding to the pieces of text. In an embodiment, the pieces of text are units in which the electronic device 2000 detects text from an image 500, and do not necessarily correspond to word units. The electronic device 2000, for example, may obtain a first cropped image 502, a second cropped image 504, . . . , an $N^{th}$ cropped image 506, etc. based on the pieces of text detected from the image 500.

According to an embodiment of the disclosure, the electronic device 2000 may recognize characters of the pieces of text in the cropped images. In some embodiments of the disclosure, the electronic device 2000 may apply the cropped images to a text recognition model in order to recognize the characters of the pieces of text. The electronic device 2000 may obtain the characters of the pieces of text respectively corresponding to the cropped images, by applying each of the cropped images to the text recognition model.

According to an embodiment of the disclosure, as a result of identifying the characters of the pieces of text via the electronic device 2000, the character of the first cropped image 502 may be "F," the characters of the second cropped image 504 may be "viated," and the characters of the $N^{th}$ cropped image 506 may be "instructions."

The electronic device 2000 according to an embodiment of the disclosure may infer a sentence in the image 500, based on the positions of the pieces of text and the characters of the pieces of text obtained based on the operations described with reference to FIGS. 5A and 5B. This aspect will be described further by referring to FIG. 6.

Figure 6:
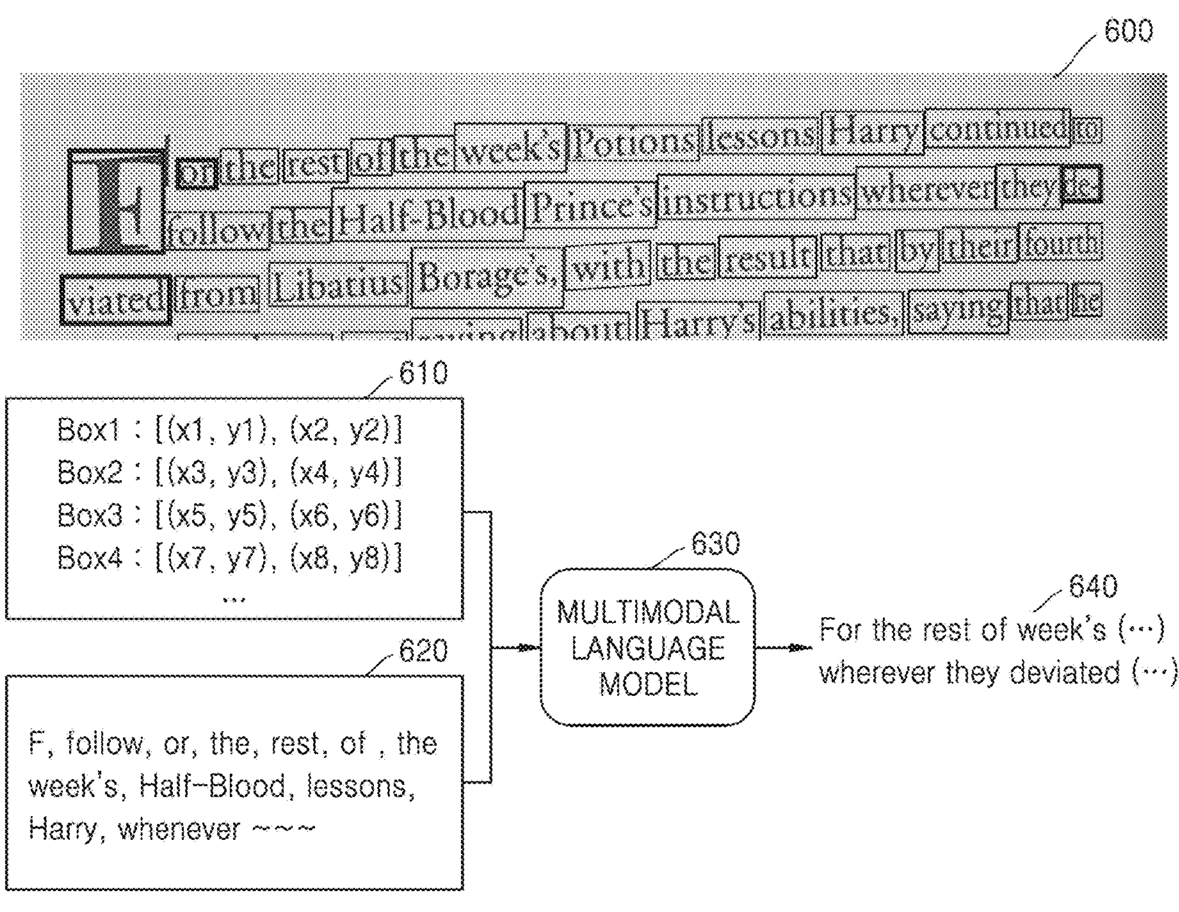
FIG. 6 is a diagram for describing an operation, performed by an electronic device, of recognizing text in an image and generating a sentence according to an embodiment of the disclosure.

FIG. 6 is a diagram for describing an operation, performed by the electronic device 2000, of recognizing text in an image and generating a sentence according to an embodiment of the disclosure.

Referring to FIG. 6, according to an embodiment of the disclosure, an electronic device 2000 may input positions 610 of pieces of text and characters 620 of the pieces of text to a multimodal language model 630. The multimodal language model may infer an original sentence 640 of text in an image 600 by receiving both of recognized characters and positions of the characters.

In an embodiment of the disclosure, when the electronic device 2000 generates a sentence, the electronic device 2000 may merge one or more of detected pieces of text by using the multimodal language model. A first piece of text 602 "F" and a second piece of text 604 "or" are detected as different pieces of text, but the first piece of text 602 "F" and the second piece of text 604 "or" may be included in one word "for" in an original sentence. For example, with respect to each of an Nth piece of text 606 "de-" and an $N+1^{th}$ piece of text 608 "viated," only portions of a word may be detected as pieces of text, due to line breaking. The $N^{th}$ piece of text 606 "de-" and the $N+1^{th}$ piece of text 608 "viated" may be the portions of a word "deviated" in the original sentence. Thus, the electronic device 2000 may merge the detected pieces of text by using the multimodal language model that generates a complete sentence by reflecting the grammar, the spelling, the regularity, etc. of a language. Accordingly, the electronic device 2000 may generate "for" by merging "F" with "or" and generate "deviated" by merging "de-" with "viated." As a result of generating the original sentence 640 by using the multimodal language model 630 via the electronic device 2000, "F" and "or" detected as the different pieces of text may be merged and a sentence "For the rest of week's . . . " may be generated, and "de-" and "viated" detected as the different pieces of text may be merged and a sentence "wherever the deviated . . . " may be generated.

FIG. 7 is a diagram for describing an operation, performed by the electronic device 2000, of generating data to be input to a multimodal language model according to an embodiment of the disclosure.

Referring to FIG. 7, according to an embodiment of the disclosure, an electronic device 2000 may obtain positions and characters of pieces of text. The electronic device 2000 may generate a text-position set by matching the characters of the pieces of text with the positions of the pieces of text, in order to input the corresponding data to the multimodal language model. The electronic device 2000 may generate a first text-position set 710 by matching a character "F" of a first piece of text with a position [(315, 1402), (435, 1532)] of the first piece of text. In an embodiment, the electronic device 2000 may generate a second text-position set 720 by matching characters "or" of a second piece of text with a position [(456, 1414), (502, 1451)] of the second piece of text.

In an embodiment of the disclosure, the electronic device 2000 may input the text-position sets to the multimodal language model. For example, the electronic device 2000 may input a plurality of text-position sets, such as the first text-position set 710, the second text-position set 720, an $M^{th}$ text-position set 730, etc., to the multimodal language model, to generate a sentence.

In an embodiment of the disclosure, the electronic device 2000 may index the text-position sets. The electronic device 2000 may assign an index to each of the text position sets to identify the text-position sets. In some embodiments of the disclosure, the electronic device 2000 may index the text-position sets of adjacent pieces of text by using close numbers. The electronic device 2000, for example, may index the first text-position set 710 of the first piece of text by using a reference number 0. As a distance between the first piece of text having the first text-position set 710 and another piece of text having another text-position set decreases, the electronic device 2000 may index the text-position set of the other piece of text by using a number that is greater than the reference number, but is relatively small. The distance between the pieces of text may be obtained by using a general algorithm for calculating a distance between boundary boxes. In detail, the electronic device 2000 may index the second text-position set 720 by using a number 1, the second text-position set 720 corresponding to the second piece of text adjacent to the first piece of text in the image. The $M^{th}$ text-position set 730 of the third piece of text positioned farther from the first piece of text than the second piece of text may be indexed by using a number that is greater than 1.

In an embodiment, the electronic device 2000 may index the text-position sets by sequentially increasing index numbers from a piece of text at an upper left end to a piece of text at a lower right end, based on a general sentence-writing method (for example, horizontal writing, etc.).

In an embodiment of the disclosure, when the electronic device 2000 inputs the text-position sets to the multimodal language model, the electronic device 2000 may further input the index numbers of the text-position sets. The electronic device 2000 may index the text-position sets to identify the text-position sets input to the multimodal language model. When the multimodal language model generates a sentence, the multimodal language may generate the sentence by reflecting the index numbers of the text-position sets, and thus, the multimodal language model may accurately infer an original sentence of the text in the image.

Figure 8:
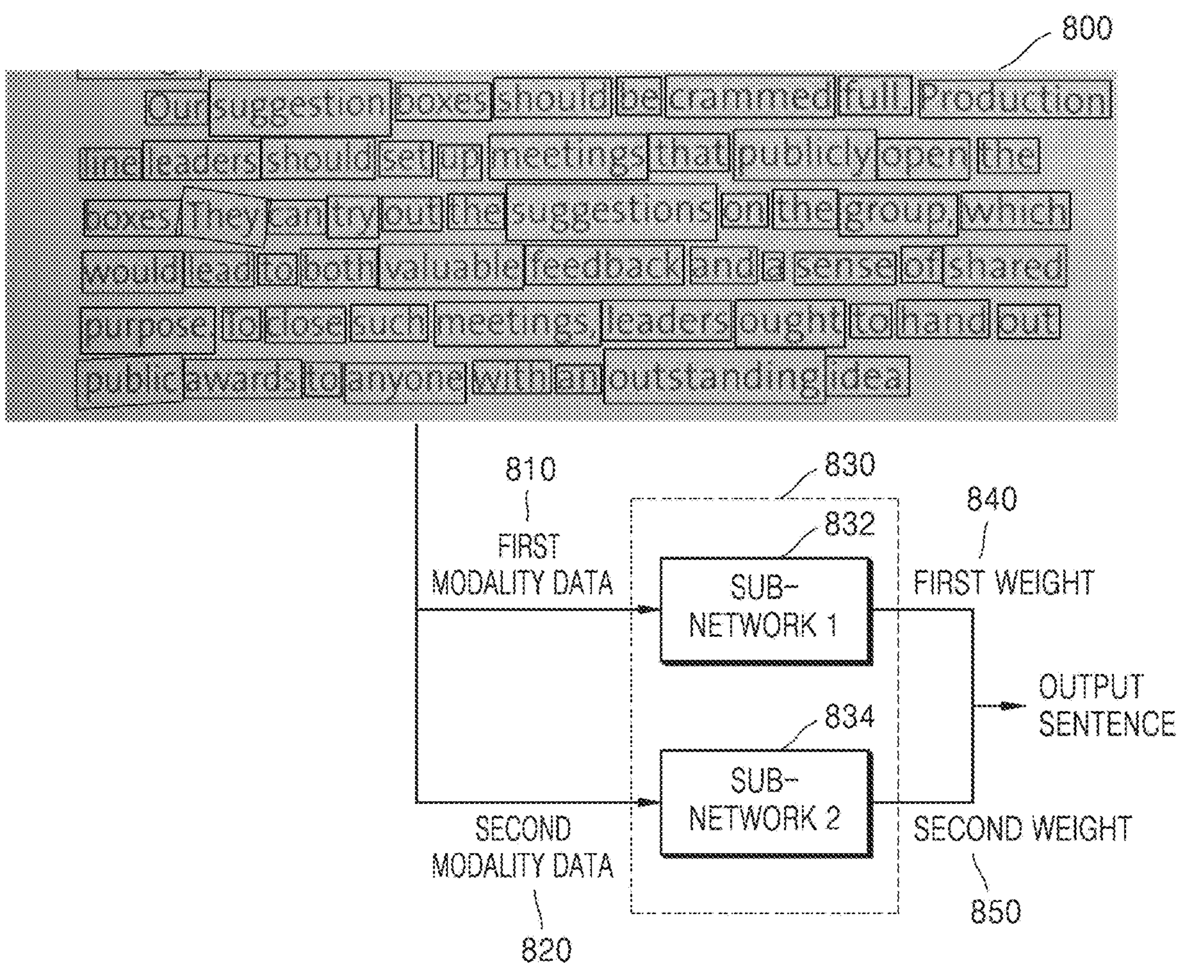
FIG. 8 is a diagram for describing an operation of a multimodal language model according to an embodiment of the disclosure.

FIG. 8 is a diagram for describing an operation of a multimodal language model according to an embodiment of the disclosure.

Referring to FIG. 8, a multimodal language model according to an embodiment of the disclosure may apply different weights to different modality data that is input.

According to an embodiment of the disclosure, the electronic device 2000 may obtain, from an image 800, modality data to be input to a multimodal language model 830. In an embodiment, the multimodal language model 830 may receive at least two types of modality data. Hereinafter, for convenience of explanation, an example in which the multimodal language model 830 receives first modality data 810 and second modality data 820 is described. However, the multimodal language model 830 may receive third modality data or other modality data.

In an embodiment of the disclosure, the multimodal language model 830 may include a plurality of sub-networks. The sub-networks may include layers appropriate for processing the input modality data, such as a CNN for processing an image, an RNN for processing text, and the like.

In some embodiments of the disclosure, the first modality data 810 may be positions of text, and the second modality data 820 may be characters of the text. The first modality data 810 may be calculated by using sub-network 1 832 of the multimodal language model 830, and the second modality data 820 may be calculated by using sub-network 2 834 of the multimodal language model 830. Calculation results of sub-network 1 832 and sub-network 2 834 may be merged with each other by using a concatenation layer. Since the multimodal language model 830 performs the calculation by using differ types of modality data, different weights may be applied to the sub-networks of the multimodal language model 830 in order to reflect the feature of each type of modality data. In some embodiments of the disclosure, the multimodal language model 830 may apply a first weight 840 to sub-network 1 832 and may apply a second weight 850 to sub-network 2 834. As a result, the multimodal language model 830 may obtain an output sentence by applying the first weight 840 to the positions of the text and applying the second weight 850 to the characters of the text.

In an embodiment, the first modality data 810 and the second modality data 820 are not limited to the examples described above. Instead of the characters of the text input as the second modality data 820, an image including the text may be input as the second modality data 820. In this case, for sub-network 2 834, a network appropriate for processing the image may be used.

Figure 9:
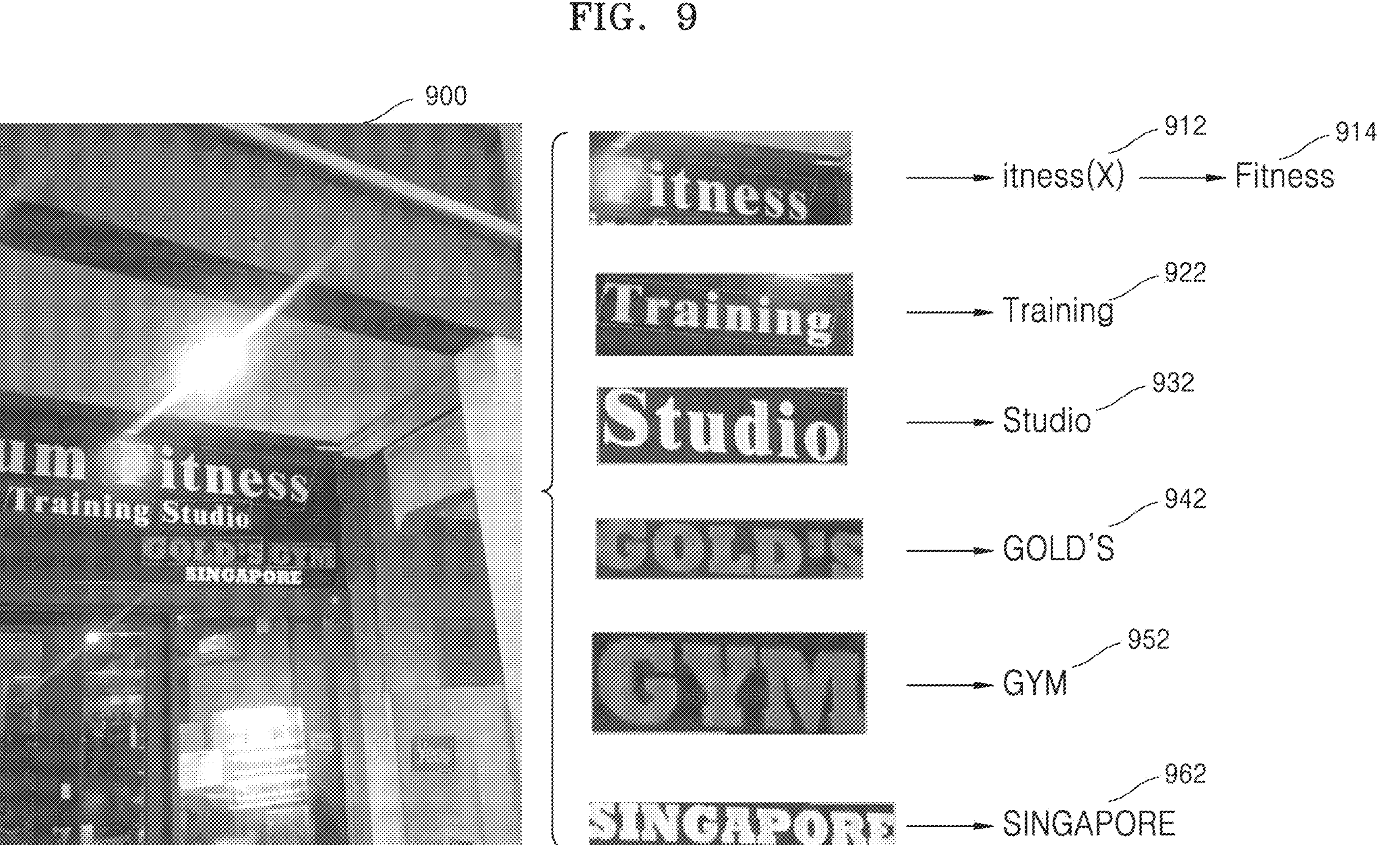
FIG. 9 is a diagram for describing an operation, performed by an electronic device, of recognizing text, according to an embodiment of the disclosure.

FIG. 9 is a diagram for describing an operation, performed by the electronic device 2000, of recognizing text, according to an embodiment of the disclosure.

Referring to FIG. 9, according to an embodiment of the disclosure, a text included in an image 900 may not be in a form of a sentence. According to an embodiment of the disclosure, when an electronic device 2000 is not able to generate a sentence by recognizing the text in the image 900, the electronic device 2000 may detect pieces of text in the image 900 and may output text recognition results by using a multimodal language model. The electronic device 2000 may modify the text recognition results based on characters and positions of the text.

In an embodiment of the disclosure, the electronic device 2000 may detect positions of a first piece of text 910 through a sixth piece of text 960 and crop areas corresponding to the first through sixth pieces of text 910 through 960 to generate cropped images. The electronic device 2000 may recognize the characters by using the image 900 and/or the cropped images. As a result of recognizing characters of the first through sixth pieces of text 910 through 960 via the electronic device 2000, a character recognition result of the first piece of text 910 may be itness 912, a character recognition result of the second piece of text 920 may be Training 922, a character recognition result of the third piece of text 930 may be Studio 932, a character recognition result of the fourth piece of text 940 may be GOLD's 942, a character recognition result of the fifth piece of text 950 may be GYM 952, and a character recognition result of the sixth piece of text 960 may be SINGAPORE 962.

In an embodiment of the disclosure, the electronic device 2000 may input positions and the characters of the first through sixth pieces of text 910 through 960 to the multimodal language model. In the example described above, it may be figured out that the character recognition result of the first piece of text 910 is wrong recognition of "Fitness" as "itness" caused by reflection in the image. The multimodal language model may change the character recognition result of the first piece of text 910, itness 912, to Fitness 914. In detail, because the position of the first piece of text 910 is adjacent to the positions of the second through sixth pieces of text 920 through 960, and the character recognition results 922 through 962 of the second through sixth pieces of text 920 through 960 are related to a gym, the multimodal language model may be modify the character recognition result of the first piece of text 910, itness 912, to the modified character recognition result, Fitness 914.

Figure 10:
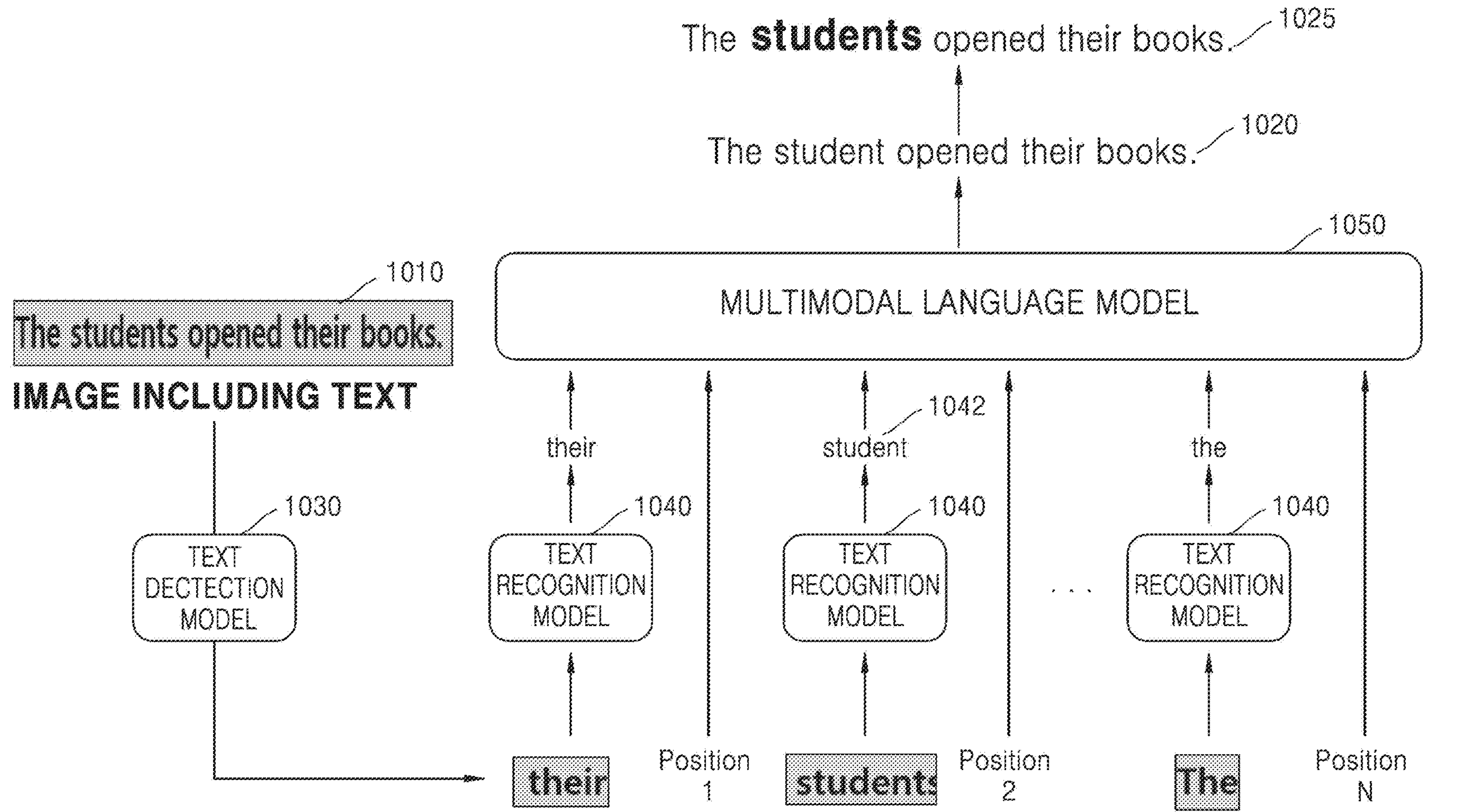
FIG. 10 is a diagram for describing an operation, performed by an electronic device, of generating a sentence, according to an embodiment of the disclosure.

FIG. 10 is a diagram for describing an operation, performed by the electronic device 2000, of generating a sentence, according to an embodiment of the disclosure.

Referring to FIG. 10, an electronic device 2000 according to an embodiment of the disclosure may generate a sentence 1020 from an image 1010 including text. In an embodiment of the disclosure, the electronic device 2000 may generate a modified sentence 1025 by changing at least a word included in the generated sentence 1020.

According to an embodiment of the disclosure, the electronic device 2000 may detect positions of pieces of text in the image 1010 including text, by using a text detection model 1030. In a situation in which the electronic device 2000 detects the positions of the pieces of text, the electronic device 2000 may crop areas corresponding to the pieces of text. The electronic device 2000 may perform character recognition on all of the pieces of text in the image 1010 including text. The electronic device 2000 may recognize characters of the pieces of text in cropped images, by using a text recognition model 1040.

In some embodiments of the disclosure, as a result of detecting the text and generating the cropped images via the electronic device 2000, a text area may be partially cropped or distorted, when the pieces of text are detected. In the text of a second cropped image 1032, the last character "s" of "students" may be cropped. When the second cropped image 1032 is applied to the text recognition model 1040, the character recognition result may be student 1042. The sentence 1020 generated by inputting the positions of the plurality of pieces of text and the characters of the plurality of pieces of text to a multimodal language model 1050 may be "The student opened their books." The multimodal language model 1050 may determine that "student" is wrongly recognized based on "their," etc. in the sentence 1020 and may generate the modified sentence 1025 "The students opened their books."

In some embodiments of the disclosure, when the electronic device 2000 displays the generated sentence 1020 and/or the modified sentence 1025, the electronic device 2000 may separately display elements of the sentence, wherein the elements of the sentence includes at least one of a subject, an object, or a verb. In an embodiment, the electronic device 2000 may request a user input with respect to whether or not the elements of the sentence are rightly separated. The user input obtained by the electronic device 2000 with respect to a result of separating the elements of the sentence may be used to update the multimodal language model 1050. The multimodal language model 1050, for example, may identify which word is modified by the elements of the sentence (for example, a modifier, etc.) of the generated sentence 1020, etc. based on the elements of the sentence and may generate the modified sentence 1025 by modifying the grammar and/or the spelling error of the sentence 1020.

In some embodiments of the disclosure, when the electronic device 2000 displays the generated sentence 1020, the electronic device 2000 may display a recommended word to replace a word in the sentence 1020 to modify the grammar and/or the spelling error of the sentence. As the multimodal language model 1050 determines the word "student" in the sentence 1020 as a spelling error, the electronic device 2000 may display a recommended word to replace "student" as "students." In an embodiment, the electronic device 2000 may generate the modified sentence 1025 by replacing a word in the sentence 1020 based on a user input of selecting the recommended word. The electronic device 2000 may display the modified sentence.

Figure 11:
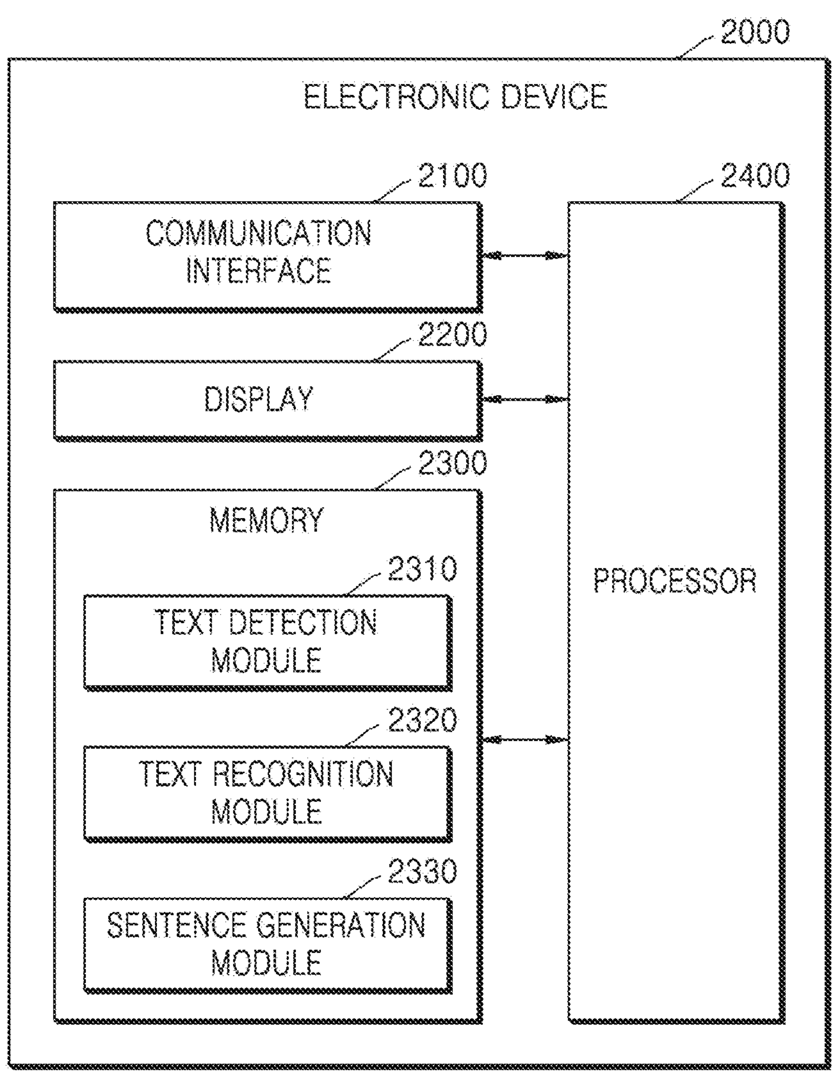
FIG. 11 is a block diagram showing components of an electronic device according to an embodiment of the disclosure.

FIG. 11 is a block diagram showing components of the electronic device 2000 according to an embodiment of the disclosure.

Referring to FIG. 11, an electronic device 2000 according to an embodiment of the disclosure may include a communication interface 2100, a display 2200, a memory 2300, and a processor 2400.

The communication interface 2100, for example, may perform data communication with other electronic devices according to control by the processor 2400.

The communication interface 2100 may perform data communication between the electronic device 2000 and other electronic devices by using at least one of data communication methods, for example, including: a wired local area network (LAN), a wireless LAN, Wi-Fi, Bluetooth, Zigbee, Wi-Fi direct (WFD), infrared data association (IrDA), Bluetooth low energy (BLE), near-field communication (NFC), wireless broadband Internet (Wibro), world interoperabiltiy for microwave access (WiMAX), a shared wireless access protocol (WSAP), wireless gigabit alliances (WiGig), radio frequency (RF) communication, and the like.

The communication interface 2100, according to an embodiment of the disclosure, may transmit and receive data for text recognition to and from an external electronic device. The communication interface 2100 may receive at least one of a text detection model, a text recognition model, or multimodal language model from the external electronic device. Also, the communication interface 2100 may receive a training data set for training at least of the described models. The communication interface 2100 may receive an input image for recognizing text in the image. Also, the communication interface 2100 may receive an input image and a request for recognizing text from the external electronic device and may transmit a text recognition result (for example, a resultant generated sentence) to the external electronic device.

The display 2200 may be configured to output an image signal on a screen of the electronic device 2000 according to control by the processor 2400. According to an embodiment of the disclosure, the processor 2400 may control the display 2200 to display a result of recognizing text in an image.

The memory 2300 may be configured to store instructions, a data structure, and a program code which may be read by the processor 2400. According to embodiments of the disclosure, operations performed by the processor 2400 may be realized by executing program instructions or codes stored in the memory 2300.

The memory 2300 may include a flash memory type, a hard disk type, a multimedia card micro type, a card-type memory (for example, secure digital (SD) or extreme digital (XD) memory), a nonvolatile memory including at least one of read-only memory (ROM), electrically erasable programmable read-only memory (EEPROM), programmable read-only memory (PROM), a magnetic memory, a magnetic disk, or an optical disk, and a volatile memory, such as random-access memory (RAM) or static random-access memory (SRAM).

The memory 2300, according to an embodiment of the disclosure, may store one or more instructions or programs for the electronic device 2000 to operate to recognize text. The memory 2300, for example, may include a text detection module 2310, a text recognition module 2320, and a sentence generation module 2330. The text detection module 2310 may include a text detection model, the text recognition module 2320 may include a text recognition model, and the sentence generation module 2330 may include a multimodal language model.

The processor 2400 may control generation operations of the electronic device 2000. The processor 2400, for example, may control generation operations of the electronic device 2000 for performing text recognition, by executing one or more instructions or programs stored in the memory 2300.

The processor 2400 may include, for example, at least one of a central processing unit (CPU), a microprocessor, a graphics processing unit (GPU), application specific integrated circuits (ASICs), digital signal processors (DSPs), digital signal processing devices (DSPDs), programmable logic devices (PLDs), field programmable gate arrays (FPGAs), an application processor, a neural processing unit, or an AI dedicated processor designed to have a hardware structure specialized for processing an AI model, but is not limited thereto.

According to an embodiment, the processor 2400 may detect positions of pieces of text in the input image by executing the text detection module 2310. The input image may be received from an external electronic device, may be stored in the memory 2300 of the electronic device 2000, or may be captured by a camera which may be included in the electronic device 2000. The processor 2400, for example, may execute the text detection model included in the text detection module 2310 and detect the positions of the pieces of text in the input image. The processor 2400 may generate cropped images by cropping areas corresponding to the pieces of text, based on the positions of the pieces of text. The text detection by the processor 2400 is described above according to the embodiments of the disclosure described above, and thus, the same descriptions are omitted.

In an embodiment of the disclosure, the processor 2400 may recognize characters of the pieces of text by executing the text recognition module 2320. The processor 2400 may execute the text recognition model included in the text recognition module 2320 to identify the characters of the pieces of text in the cropped images. The text recognition by the processor 2400 is described above according to the embodiments of the disclosure described above, and thus, the same descriptions are omitted.

In an embodiment of the disclosure, the processor 2400 may generate a sentence corresponding to the text in the image by executing the sentence generation module 2330. The processor 2400 may execute the multimodal language model included in the sentence generation module 230 to generate the sentence, which is a result of inferring an original sentence of the text in the image. The sentence generation by the processor 2400 is described above according to the embodiments of the disclosure described above, and thus, the same descriptions are omitted.

Figure 12:
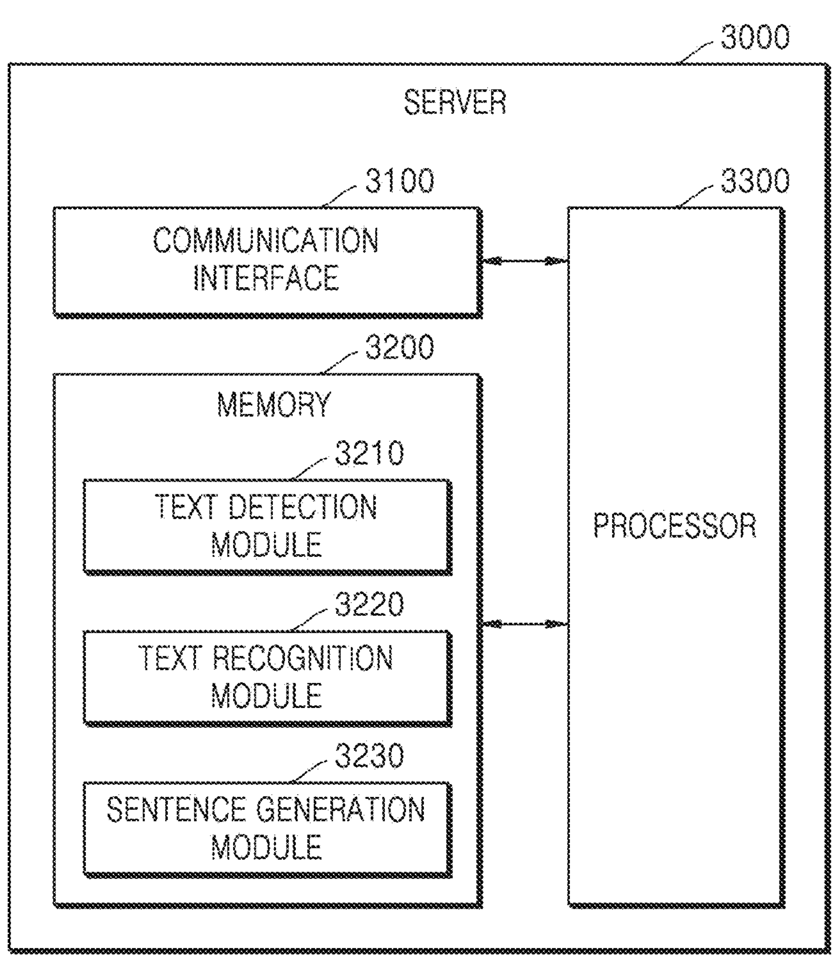
FIG. 12 is a block diagram showing components of a server according to an embodiment of the disclosure.

FIG. 12 is a block diagram showing components of a server 3000 according to an embodiment of the disclosure.

According to an embodiment of the disclosure, the described operations of the electronic device 2000 for recognizing text may be performed by the server 3000.

Referring to FIG. 12, the server 3000 may include a communication interface 3100, a memory 3200, and a processor 3300. Operations of the communication interface 3100, the memory 3200, and the processor 3300 of the server 3000 may correspond to the communication interface 2100, the memory 2300, and the processor 2400 of the electronic device 2000, respectively, and thus, the same descriptions are omitted. For example, the memory 3200 may include a text detection module 3210, a text recognition module 3220, and a sentence generation module 3230.

In an embodiment of the disclosure, the processor 3300 may receive an input image and a request for text recognition from an external electronic device (for example, a user device) and may transmit a result of text recognition to the external electronic device. A generated sentence may be displayed on a display of the external electronic device.

The block diagrams of the electronic device 2000 of FIG. 11 and the server 3000 of FIG. 12 are block diagrams according to an embodiment of the disclosure. Each component of the block diagrams may be integrated, added, or omitted according to the specification of devices that are actually realized. Two or more components may be integrated into one component, or one component may be divided into two or more components, according to necessity. Also, functions executed in each block are disclosed to describe the embodiments of the disclosure, and their specific operations or devices do not limit the scope of the disclosure.

An embodiment of the disclosure may be implemented by a machine-readable recording medium including an instruction executable by a computer, such as a program module executable by a computer. Computer-readable media (i.e., machine-readable storage medium) may be arbitrary media which may be accessed by computers and may include volatile and non-volatile media, and detachable and non-detachable media. Also, the computer-readable media may include computer storage media and communication media. The computer storage media include all of volatile and non-volatile media, and detachable and non-detachable media which are designed as methods or techniques to store information including computer-readable instructions, data structures, program modules, or other data. The communication media may generally include other data of a modulated data signal, such as a computer-readable instruction, a data structure, or a program module.

Also, the computer-readable storage media or machine-readable storage medium may be provided in a form of a non-transitory storage medium. The "non-transitory storage medium" only denotes a tangible device and does not contain a signal (for example, electromagnetic waves). This term does not distinguish a case where data is stored in the storage medium semi-permanently and a case where the data is stored in the storage medium temporarily. For example, the "non-transitory storage medium" may include a buffer where data is temporarily stored.

In an embodiment of the disclosure, a method according to various embodiments disclosed in the disclosure may be provided by being included in a computer program product. The computer program product may be transacted between a seller and a purchaser. The computer program product may be distributed in a form of machine-readable storage medium (for example, a CD-ROM), or distributed (for example, downloaded or uploaded) through an application store or directly or online between two user devices (for example, smart phones). In the case of online distribution, at least a part of the computer program product (for example, a downloadable application) may be at least temporarily generated or temporarily stored in a machine-readable storage medium, such as a server of a manufacturer, a server of an application store, or a memory of a relay server.

The above descriptions of the disclosure are examples, and it would be understood by one of ordinary skill in the art that the disclosure may be easily modified as other specific forms without changing the technical concept or essential features of the disclosure. Hence, it will be understood that the embodiments described above are examples in all aspects and are not limiting of the scope of the disclosure. For example, each of components described as a single unit may be executed in a distributed fashion, and likewise, components described as being distributed may be executed in a combined fashion.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method, performed by an electronic device, of recognizing a text in an image, the method comprising:

detecting spatial positions of pieces of text included in the text in the image;

generating cropped images by cropping an area for each of the pieces of text in the image based on the detected spatial positions;

recognizing characters of the pieces of text for each of the cropped images;

generating a sentence by inputting the characters and respective spatial positions of each piece of text into a multimodal language model ; and displaying the sentence, wherein the multimodal language model is an artificial intelligence (AI) model for inferring an original sentence of the text, wherein the multimodal language model includes a plurality of sub-networks having different layers appropriate for processing different input modality data, the sub-networks including a first sub-network configured to calculate first input modality data comprising positions of text and a second sub-network configured to calculate second input modality data comprising characters of text, and wherein the multimodal language model applies a first weight to the first sub-network and a second weight to the second sub-network, and obtains the sentence by applying the first weight to the positions of the text and the second weight to the characters of the text.

2. The method of claim 1, wherein the multimodal language model has been trained based on a training data set including positions of a sentence and words in the sentence.

3. The method of claim 2, wherein the detecting of the positions of the pieces of text comprises obtaining data indicating the positions of the pieces of text by applying the image to a text detection model.

4. The method of claim 3, wherein the recognizing of the characters of the pieces of text comprises obtaining the characters of the pieces of text corresponding to each of the cropped images, respectively, by applying each of the cropped images to a text recognition model.

5. The method of claim 1, further comprising:

generating a text-position set by matching a character of a first piece of text of the text with a position of the first piece of text and matching a character of a second piece of text of the text with a position of the second piece of text, wherein the generating of the sentence comprises inputting the text-position set to the multimodal language model.

6. The method of claim 5, further comprising:

indexing the text-position set, wherein the inputting of the text-position set to the multimodal language model comprises further inputting an index of the text-position set to the multimodal language model.

7. The method of claim 1, wherein the generating of the sentence comprises applying a different weight to each of the positions of the pieces of text and the characters of the pieces of text.

8. The method of claim 1, wherein the displaying of the sentence comprises separately displaying elements of the sentence, and wherein the elements of the sentence comprising at least one of a subject, an object, or a verb.

9. The method of claim 8, wherein the displaying of the sentence further comprises displaying a recommended word for replacing a word in the sentence in order to modify a grammar or spelling error of the sentence.

10. An electronic device for recognizing a text in an image, the electronic device comprising:

a display;

a memory storing one or more instructions; and at least one processor configured to execute the one or more instructions stored in the memory to:

detect spatial positions of pieces of text included in the text in the image, generate cropped images by cropping an area for each of the pieces of text in the image based on the detected spatial positions, recognize characters of the pieces of text for each of the cropped images, generate a sentence by inputting the characters and respective spatial positions of each piece of text into a multimodal language model, and control the display to display the sentence, wherein the multimodal language model is an artificial intelligence (AI) model for inferring an original sentence of the text, wherein the multimodal language model includes a plurality of sub-networks having different layers appropriate for processing different input modality data, the sub-networks including a first sub-network configured to calculate first input modality data comprising positions of text and a second sub-network configured to calculate second input modality data comprising characters of text, and wherein the multimodal language model applies a first weight to the first sub-network and a second weight to the second sub-network, and obtains the sentence by applying the first weight to the positions of the text and the second weight to the characters of the text.

11. The electronic device of claim 10, wherein the multimodal language model has been trained based on a training data set including positions of a sentence and words in the sentence.

12. The electronic device of claim 11, wherein the at least one processor is further configured to execute the one or more instructions to obtain data indicating the positions of the pieces of text by applying the image to a text detection model.

13. The electronic device of claim 12, wherein the at least one processor is further configured to execute the one or more instructions to obtain the characters of the pieces of text corresponding to each of the cropped images, respectively, by applying each of the cropped images to a text recognition model.

14. The electronic device of claim 10, wherein the at least one processor is further configured to execute the one or more instructions to:

generate a text-position set by matching a character of a first piece of text of the text with a position of the first piece of text and matching a character of a second piece of text of the text with a position of the second piece of text, and input the text-position set to the multimodal language model.

15. The electronic device of claim 14, wherein the at least one processor is further configured to execute the one or more instructions to:

index the text-position set, and input an index of the text-position set to the multimodal language model.

16. The electronic device of claim 10, wherein the at least one processor is further configured to execute the one or more instructions to separately display elements of the sentence, and wherein the elements of the sentence comprising at least one of a subject, an object, or a verb.

17. The electronic device of claim 16, wherein the at least one processor is further configured to execute the one or more instructions to control the display to display a recommended word for replacing a word in the sentence in order to modify a grammar or spelling error of the sentence.

18. One or more non-transitory computer-readable storage media storing one or more computer programs including computer-executable instructions that, when executed by one or more processors of an electronic device individually or collectively, cause the electronic device to perform operations for recognizing a text in an image, the operations comprising:

detecting spatial positions of pieces of text included in the text in the image;

generating cropped images by cropping an area for each of the pieces of text in the image based on the detected spatial positions;

recognizing characters of the pieces of text for each of the cropped images;

generating a sentence by inputting the characters and respective spatial positions of each piece of text into a multimodal language model; and displaying the sentence, wherein the multimodal language model is an artificial intelligence (AI) model for inferring an original sentence of the text, wherein the multimodal language model includes a plurality of sub-networks having different layers appropriate for processing different input modality data, the sub-networks including a first sub-network configured to calculate first input modality data comprising positions of text and a second sub-network configured to calculate second input modality data comprising characters of text, and wherein the multimodal language model applies a first weight to the first sub-network and a second weight to the second sub-network, and obtains the sentence by applying the first weight to the positions of the text and the second weight to the characters of the text.

* * * * *